United States Patent [19]

Barrall et al.

[11] 4,072,533

[45] Feb. 7, 1978

[54] LIGHTWEIGHT, NON-CEMENTITIOUS BUILDING MATERIAL

[75] Inventors: Jeffery L. Barrall; William R. Reed, both of Lancaster, Pa.

[73] Assignee: Armstrong Cork Company, Lancaster, Pa.

[21] Appl. No.: 732,534

[22] Filed: Oct. 14, 1976

[51] Int. Cl.$^2$ ............................................. C04B 35/16
[52] U.S. Cl. .................... 106/84; 106/DIG. 2
[58] Field of Search ............ 106/84, 77, DIG. 2, 106/74

[56] References Cited

U.S. PATENT DOCUMENTS

| | | | |
|---|---|---|---|
| 3,658,564 | 4/1972 | Gerow et al. | 106/84 |
| 3,769,065 | 10/1973 | Dunn | 106/84 |
| 3,933,514 | 1/1976 | Banks et al. | 106/84 |

*Primary Examiner*—Patrick P. Garvin
*Assistant Examiner*—J. V. Howard

[57] ABSTRACT

An improved lightweight building material capable of being formed in a continuous sheet operation. The material comprises sodium silicate as a binder and an expanded inorganic aggregate. In addition, an efflorescence inhibitor is included in such composition comprising boric acid, a metal borate selected from the group consisting of zinc borate, calcium borate, magnesium borate and mixtures thereof, a calcium salt selected from the group consisting of calcium sulfate, calcium nitrate, calcium phosphate, calcium orthophosphate and mixtures thereof, an alkali metal fluorosilicate, or mixtures of the above.

11 Claims, No Drawings

LIGHTWEIGHT, NON-CEMENTITIOUS BUILDING MATERIAL

BACKGROUND OF THE INVENTION

1. Field of the Invention

This invention relates to non-cementitious building materials. More particularly, it relates to an improved lightweight, cement-free building material utilizing sodium silicate as a binder and an expanded siliceous inorganic aggregate.

2. Description of the Prior Art

For many years those skilled in the art have provided a variety of compositions that are useful as low-cost, thermal insulating building materials particularly of use in commercial and residential buildings. The most common of such materials are those having binders comprising cement, such as Portland cement, admixed with a lightweight inorganic aggregate as, for example, vermiculite or perlite. While building materials composed of these materials are generally useful, they are disadvantageously porous and absorb water readily from the ambient atmosphere. Under freeze/thaw conditions, the deterioration in physical properties of these materials is dramatic, and their use as building materials is substantially diminished. Attempts to avoid the water susceptibility of such materials have eventually led to lightweight building materials having good thermal insulation and comprising binders that may include various cements, but also include the silicates of potassium or sodium. Unlike the cement-based materials, these compositions show acceptable water resistance and do not absorb the quantities of water found so disadvantageous in the cement-based compositions. However, they are not entirely immune from water absorption and absorb very small quantities of moisture from the atmosphere. While not being particularly affected under freeze/thaw conditions, a significant manifestation of the small amounts of water absorption appears in the form of efflorescence, a sign that is particularly indicative of the dissolution of the silicate binder. In systems of this nature, this dissolution of the silicate glasses is more rapid in the presence of small amounts of water than with large amounts. The reason for this is that the sodium oxide in silicate glass is leached out, giving a solution of sodium hydroxide, the resulting residual glass being of higher $SiO_2$—$Na_2O$ ratio. It is well recognized that the silica will leach out of this material when the pH of the solution becomes high. Therefore, in the presence of a small amount of water, a given amount of sodium oxide leached from the siliceous glass will give a higher pH than would the same amount when leached into a larger quantity of water. Thus, silicate glass binders, which contain water because drying conditions are not sufficient to convert them to the anhydrous form or because of absorption of small amounts of water from the ambient atmosphere, will be adversely affected. Two major disadvantages occur. The sodium hydroxide formed reacts with carbon dioxide present in the atmosphere, forming sodium carbonate, which manifests itself as efflorescence, e.g. a white powder, on the surface of the board. Secondly, if the sodium hydroxide solution surrounding the glass binder is sufficiently concentrated, the remainder of the silicate glass binder will dissolve, completely destroying any binding capability with any building material and resulting in complete failure of such material. The efflorescence problem can be solved by using the potassium silicate glasses instead of the sodium ones, potassium carbonate not effloresing as does sodium carbonate. However, potassium glasses are economically disadvantageous when compared to the sodium silicates.

Accordingly, it is an object of the present invention to provide a lightweight, non-cementitious building material that shows little deterioration in physical properties when exposed to ambient atmosphere.

It is a further object of the present invention to provide a lightweight, non-cementitious building material that contains sodium silicate and is non-efflorescent.

SUMMARY OF THE INVENTION

There is provided by virtue of this invention an improved inorganic material which can be formed by a continuous sheet operation. The sheet material is one comprising an inorganic siliceous aggregate and sodium silicate which, because of certain additives, shows improved strength after exposure to ambient conditions and non-efflorescence. The additives comprise a boron compound selected from the group consisting of boric acid, the borates of zinc, calcium, magnesium, and mixtures thereof, a calcium salt selected from the group consisting of calcium sulfate, calcium nitrate, calcium phosphate, calcium orthophosphate and mixtures thereof, an alkali metal fluorosilicate, or mixtures of the above.

DESCRIPTION OF THE PREFERRED EMBODIMENT

The improved building material is formed in accordance with the present invention is a thermally insulating, non-cementitious board product comprising sodium silicate binder and an expanded siliceous inorganic aggregate; and for certain special cases to give good handling and the like, organic fibers such as polyester fibers or polyamide fibers, etc. To these components an efflorescence inhibitor is added. This inhibitor not only decreases the tendency of the sodium silicate to effloresce, but improves the long-term physical properties of the composition.

In a preferred embodiment of the present invention, where good insulation qualities and high flame resistance are sought, an expanded perlite is used. The preferred perlite, in accordance with the present invention, has the characteristics of a loose bulk density of between 2 and 10 pounds per cubic foot, and a particle size of between 5 and 100 as measured by a standard Tyler Sieve Mesh. Such is present in the formulations in accordance with the present invention in amounts of from about 80% to about 39% based on amount of total formula, preferably 60% to 45% by weight.

While the preferred embodiment, in accordance with the present invention, utilizes expanded perlite having the above characteristics, other embodiments using various expanded siliceous inorganic aggregates can also be used herein. Accordingly, expanded perlite having densities and particle sizes outside of the range disclosed above may also be useful where the density, strength, or insulating values of the resulting building material are not of primary importance. By the same token, other heat-resistant siliceous inorganic aggregates, such as expanded clay, cellular glass, expanded vermiculite and cellular diatomaceous earths, may also be used as part or total replacement for the expanded perlite disclosed above.

In conjunction with the expanded perlite, an inorganic binder is used which is a sodium silicate. While potassium silicate is useful in this invention and may replace sodium silicate in its entirety, it suffers from disadvantageously high cost in comparison to sodium silicate. The preferred embodiment of the present invention, therefore, utilizes sodium silicate as the binder for the preferred expanded perlite. In practicing the present invention and as noted in the earlier discussion, the more alkaline silicates have adverse effects on the efflorescence and strength of the building material incorporating these materials. Therefore, it is preferred to use sodium silicates comprising alkali to silica ratios of from about 1:4 to about 1:2 in amounts, as hereinafter shall be set forth on a dry weight basis, from about 15% to about 60% based on the dry weights of solids of the product. While a satisfactory product may be made within these ranges, we prefer the following ranges: A ratio of alkali to silica of from about 1:4 to about 1:3 and from about 25% to about 40% of dry silicate in the composition of the product.

If the soluble silicates have an alkali:silica ratio higher than 1:4, then solubility of the resulting alkali silicates diminishes to the extent that solutions of such are difficult to form. Further, if amounts of less than 15% of dry silicate is used, the finished product will be weakened, while more than 60% of dry silicate will result in a board of undesirably high density having poor physical properties, e.g. low insulating ability and low N.R.C. Similarly, adverse effects are noted with alkali silicate ratios higher than that shown. Compositions comprising the above-disclosed expanded perlite or other siliceous inorganic material and sodium silicate will, as noted earlier, show efflorescence and a decrease in physical property with time of exposure to ambient conditions. The improved building material in accordance with the present invention additionally incorporates an efflorescence inhibitor comprising a boron compound selected from the group consisting of boric acid and the borates of calcium, magnesium, and the like. Additionally, other efflorescence inhibitors are the calcium salts selected from the group consisting of calcium sulfate, calcium nitrate, calcium phosphate, and calcium orthophosphate, as well as various alkali metal fluorosilicates. Mixtures of the above efflorescence inhibitors can also be used.

The efflorescence inhibitors are most successfully used in the improved building material in accordance with the present invention in an amount no less than 6% by weight of efflorescence inhibitor as based on the amount of dry silicate present. As an upper limit to the amount of efflorescence inhibitor, amounts greater than 45 weight percent efflorescence inhibitor based on dry weight of silicate should not be exceeded. Inhibitor concentrations of greater than such percentage show weakened building material physical properties, whereas amounts of less than 6% do not effectively provide protection against efflorescence and physical property diminution from exposure to ambient conditions. Preferably, 10% efflorescence inhibitor to 37% efflorescence inhibitor based on the dry weight percent of silicate is used, most preferably 25% to 30%.

Optionally, up to about 30 weight percent of the expanded siliceous inorganic aggregate may be replaced by other materials, such comprising organic fibers. While a composition may be formed from amounts greater than this, the resulting material fails to meet certain building product fire requirements, e.g. it burns readily. Preferably, 5% of the expanded siliceous inorganic aggregate is replaced by organic fibers, most preferably 1% by weight. The organic fibers may be polyester, polyamide, or polypropylene fiber, or even mixtures of such fibers. Vitreous fibers may be used to replace the organic fibers provided that they are alkali-resistant so as to not be dissolved by the sodium silicate binder. Such alkali resistance is accomplished by means of the chemical composition of the fibers or by protective dressings applied to the fibers. These alkali-resistant fibers can be used as a total replacement of the organic fibers or as partial replacement of such. Preferably, 30%–60% of the organic fiber is replaced by the vitreous fiber in this embodiment of the present invention.

In forming the building material in accordance with the present invention, the expanded siliceous inorganic aggregate is admixed with the sodium silicate solution. In the case where organic or inorganic fibers are also used herein, the expanded aggregate is first mixed with the fluffed fibers in the dry form and the mixture then wetted with sodium silicate solution. In either case, the resulting composition is in the form of a slightly wet mixture somewhat resembling damp sand and has added to it the efflorescence inhibitor or inhibitors as disclosed above. Further mixing is accomplished to assure good distribution of the inhibitor throughout the mass. The slightly wet mixture is then pressed and dried. Pressing and drying is accomplished by pressing the mixture to a desired thickness at about 30–200 psi. The pressed board-like mass is then oven dried, preferably at 200° F. for about 3 hours. Faster drying conditions are achieved at temperatures higher than 200° F., but not greater than 400° F. Most preferably, the board-like mass is first dried at 200° F. for 30 minutes and the oven temperature raised to 250°–350° F. for 2 to 1 hour. In order that the invention be better understood, improved building materials in accordance with the present invention, together with their method of manufacture as disclosed above, will be described by way of examples. In the following description of the improved building materials, all proportions are based on the dry weight of components.

EXAMPLE 1

| | |
|---|---|
| Expanded Perlite | 57% |
| Sodium Silicate Solution comprising 104 grams sodium silicate in 221 grams water | 30% |
| Polyester Fiber | 1% |
| Calcium Metaborate Hexahydrate | 12% |

The furnish ingredients were mixed in a conventional mechanical mixer by firstly preparing a dry mix of calcium metaborate, polyester fiber and expanded perlite of bulk density 3 lbs/ft$^3$, Tyler Sieve Mesh 5-100. To this mixture was added the sodium silicate solution and mixing was continued until the mixing mass was uniformly wet. The resulting wetted solids were formed into a board and pressed at 60 psi and 200° F. for 3 hours. The resultant dry board had a thickness of ⅜ inch, a density of 1.1 pounds/board foot, and a modulus of rupture of 120 psi.

EXAMPLE 2

The technique of Example 1 was repeated with the following composition:

| | |
|---|---|
| Perlite | 58% |
| Sodium Silicate Solution | 30% |

-continued

| Calcium Metaborate Hexahydrate | 12% |

The resultant dry board had a thickness of ⅜ inch and a modulus of rupture of 100 psi.

EXAMPLE 3

The technique of Example 1 was repeated with the following formulation:

| Perlite | 63% |
| Sodium Silicate Solution | 33% |
| Calcium Metaborate Hexahydrate | 3% |
| Polyester Fiber | 1% |

The resultant dry board had a thickness of ⅜ inch and a modulus of rupture of 140 psi.

EXAMPLE 4

The technique of Example 1 was repeated with the following formulation:

| Perlite | 51% |
| Sodium Silicate Solution | 26% |
| Calcium Metaborate Hexahydrate | 22% |
| Polyester Fiber | 1% |

The resultant dry board had a thickness of ⅜ inch and a modulus of rupture of 90 psi.

The efflorescence of the building materials formed of the above examples and other illustrative examples was evaluated by the following test technique. A sample approximately 3 inches by 9 inches is placed in the desiccator having 1 to 2 inches of water. Carbon dioxide gas is then passed into the desiccator and after 3 minutes of allowing the gas to flood the desiccator volume, the lid is attached. After 24 hours, the sample is removed and allowed to air dry. Efflorescence is evaluated by a visual examination of the amount of efflorescent materials formed on the sample after undergoing the test, on a scale of 0 to 10, 0 being no efflorescence. The following table illustrates the results obtained for compositions in accordance with the present invention.

| Example[a] | Efflorescence Inhibitor | Concentration[b] % | Degree of Efflorescence |
|---|---|---|---|
| 1 | Calcium Metaborate | 28 | 0 |
| 2 | " | 28 | 0 |
| 3 | " | 10 | 4 |
| 4 | " | 45 | 0 |
| 5 | Boric Acid | 17 | 5 |
| 6 | Zinc Borate | 25 | 8 |
| 7 | Magnesium Borate | 25 | 3 |
| 8 | Calcium Tetraborate | 29 | 2 |
| 9 | Calcium Sulfate | 29 | 2 |
| 10 | Calcium Phosphate | 6 | 9 |
| 11 | Calcium Orthophosphate | 6 | 9 |
| 12 | Calcium Nitrate | 30 | 8 |
| 13 | Sodium Fluorosilicate | 30 | 1 |
| 14 | Potassium Fluorosilicate | 23 | 1 |
| Comparative | None | 0 | 10 |

[a]The formulations of Examples 5–14 and comparative are identical to that set forth in Example 1, except for the substitution of the listed efflorescence inhibitors.
[b]Concentration of inhibitors is based on the amount of dry sodium silicate present. See Example 1.

Having now fully described the invention, it will be apparent to one skilled in the art that many changes and modifications can be made thereto without departing from the spirit or the scope of the invention as set forth herein.

What is claimed is:

1. An improved non-cementitious building material comprising sodium silicate and an expanded siliceous inorganic aggregate, the improvement comprising said building material further including an efflorescence inhibitor comprising a boron compound selected from the group consisting of the borates of zinc, calcium, magnesium, and mixtures thereof; a calcium salt selected from the group consisting of calcium nitrate, calcium phosphate, calcium orthophosphate, and mixtures thereof.

2. The improved building material in accordance with claim 1 wherein said expanded siliceous inorganic aggregate is perlite and said sodium silicate is $Na_2O:SiO_2$ of 1:4 to about 1:2.

3. The improved building material in accordance with claim 1 wherein said efflorescence inhibitor is selected from the group consisting of zinc borate, magnesium borate, calcium borate and mixtures thereof.

4. The improved building material in accordance with claim 1 wherein said efflorescence inhibitor is selected from the group consisting of calcium phosphate, calcium orthophosphate, calcium nitrate and mixtures thereof.

5. The improved building material in accordance with claim 2 wherein said perlite has a loose bulk density of between 2 to 10 pounds per cubic foot and between 5 and 100 Tyler Sieve Mesh number.

6. The improved building material in accordance with claim 2 wherein said perlite content is about 39% to about 80% of the total formula.

7. The improved building material in accordance with claim 3 wherein said efflorescence inhibitor is in the range of 6% to 45% by weight based on said sodium silicate.

8. The improved building material in accordance with claim 5 wherein said efflorescence inhibitor is in the range of 6% to 45% by weight based on said sodium silicate.

9. The improved building material of claim 6 additionally containing an organic fiber, said organic fiber replacing the perlite in 5% to 30% of said perlite content.

10. An improved non-cementitious building material comprising sodium silicate and 39%–80% by weight of an expanded perlite, the improvement comprising said building material further including 10 to 37 weight percent of a boron compound selected from the group consisting of zinc borate, calcium metaborate, magnesium borate, and mixtures thereof, based on weight of said sodium silicate.

11. A method for forming an improved non-cementitious building material comprising
 1. admixing sodium silicate with an expanded siliceous inorganic aggregate;
 2. adding to said admixture a boron compound selected from the group consisting of the borates of zinc, calcium, magnesium, and mixtures thereof; a calcium salt selected from the group consisting of calcium nitrate, calcium phosphate, calcium orthophosphate, and mixtures thereof; and
 3. pressing and drying the mixture of step 2; whereby the efflorescence of the pressed and dried material of step 3 is inhibited.

* * * * *